(12) United States Patent
Holmes (10) Patent No.: US 6,922,513 B2
(45) Date of Patent: Jul. 26, 2005

(54) OPTICAL DEVICES AND METHODS OF MANUFACTURE THEREOF

(75) Inventor: Melanie Holmes, Woodbridge (GB)

(73) Assignee: Thomas Swan & Co., Ltd., Durham (GB)

(*) Notice: Subject to any disclaimer, the term of this patent is extended or adjusted under 35 U.S.C. 154(b) by 390 days.

(21) Appl. No.: 10/148,906
(22) PCT Filed: Dec. 4, 2000
(86) PCT No.: PCT/GB00/04634
§ 371 (c)(1),
(2), (4) Date: Jun. 3, 2002
(87) PCT Pub. No.: WO01/40832
PCT Pub. Date: Jun. 7, 2001

(65) Prior Publication Data
US 2002/0181910 A1 Dec. 5, 2002

(30) Foreign Application Priority Data
Dec. 3, 1999 (GB) .............................. 9928696

(51) Int. Cl.$^7$ ................................. G02B 6/02
(52) U.S. Cl. .................. 385/127; 385/126; 385/128
(58) Field of Search ................... 385/126–128, 385/123, 124, 43; 65/385

(56) References Cited

U.S. PATENT DOCUMENTS

| | | | |
|---|---|---|---|
| 4,886,538 A | | 12/1989 | Mahapatra ................. 65/30.13 |
| 5,035,477 A | * | 7/1991 | Schlump ....................... 385/38 |
| 5,157,747 A | | 10/1992 | Aktins et al. ................. 385/37 |
| 5,175,788 A | * | 12/1992 | Miura et al. ................ 385/131 |
| 5,416,863 A | | 5/1995 | Vengsarkar ................... 385/28 |
| 5,508,842 A | * | 4/1996 | Takeda et al. ............ 359/341.1 |
| 5,778,129 A | | 7/1998 | Shukunami et al. ........ 385/127 |
| 5,905,837 A | * | 5/1999 | Wang et al. ................ 385/123 |
| 6,018,533 A | * | 1/2000 | Krivoshlykov ................. 372/6 |
| 6,205,263 B1 | * | 3/2001 | Lieberman et al. ........... 385/12 |
| 6,411,757 B1 | * | 6/2002 | Brener et al. ................. 385/43 |
| 6,549,711 B1 | * | 4/2003 | Shimada et al. ............ 385/123 |
| 6,714,711 B1 | * | 3/2004 | Lieberman et al. ......... 385/124 |

FOREIGN PATENT DOCUMENTS

| | | | |
|---|---|---|---|
| EP | 0 585 533 A1 | 3/1994 | ........... G02B/6/255 |
| EP | 0 770 890 A1 | 5/1997 | ............ G02B/6/16 |
| EP | 0 895 103 A1 | 2/1999 | ............ G02B/6/14 |
| WO | WO 97/26571 | 7/1997 | ............ G02B/6/16 |
| WO | 99/12917 | 3/1999 | |
| WO | 9951224 | 10/1999 | |

OTHER PUBLICATIONS

R. Tammnela, et al., "Triple Layer Refractive Index Profile for Tapered Fibre Beam Expanders", Electronics Letters, vol. 25, No. 18, Aug. 31, 1989, pp. 1205–1206.

F. Martinez, et al., "Practical Single–Mode Fibre–Horn Beam Expander", Electronics Letters, vol. 24, No. 1, Jan. 7, 1988, pp. 14–16.

Kazuo Shiraishi, et al., "Beam Expanding Fiber Using Thermal Diffusion of the Dopani", Journal of the Lightwave Technology, vol. 8, No. 8, Aug. 1990, pp. 1151–1161.

* cited by examiner

Primary Examiner—Joseph Williams
Assistant Examiner—Dalei Dong
(74) Attorney, Agent, or Firm—Allston L. Jones (57) ABSTRACT

An optical fiber has a core, an inner cladding and an outer cladding on. In a first region the inner cladding refractive index has a first value which differs from the core refractive index by about 0.0045. The inner cladding refractive index changes along said fiber from the first value to a second value at a free-space end. The second value matches the core refractive index, so that the effective diameter of the core at the free-space end is that of the core plus the inner cladding. Hence the outer cladding acts to constrain the light in the end region. The spot-size and the V number (normalized frequency) are increased, thereby increasing offset tolerances.

17 Claims, 8 Drawing Sheets

OPTICAL DEVICES AND METHODS OF MANUFACTURE THEREOF

This application is a 371 of PCT/GB00/04634 filed on Dec. 4, 2000.

The present invention relates to optical devices and in particular, but not exclusively, to optical fibres. The present invention also relates to methods for the manufacture of optical devices.

Figure 1:
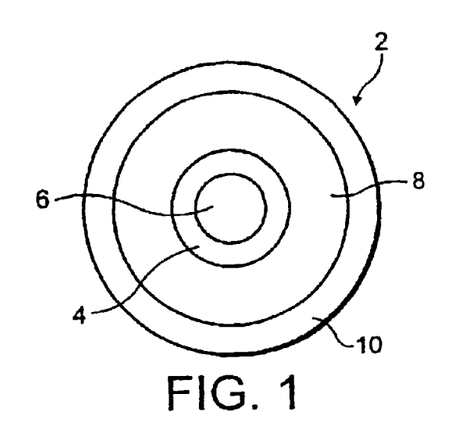
FIG. 1 shows a cross section through a known optical fibre.

Reference is made to FIG. 1 which shows the cross section through an optical fibre. The optical fibre 2 has a core 6. The core 6 is surrounded by an inner cladding 4 which in turn is surrounded by an outer cladding 8. The outer layer of the optical fibre is a sheath 10 which protects the optical fibre. The refractive indices of the core 6 and the inner cladding 4 are selected along with the core diameter so that a light beam will travel substantially down the core of the fibre. The size of the light beam as it travels down the core is determined by both the refractive index difference between the core 6 and the inner cladding 4 and the core diameter. The beam size is sometimes referred to as the "spot size".

Optical fibres are widely used and it is often necessary to join two fibres together. This may be using a splicing technique, a single fibre connector or a more complicated connector having an array of fibres, which are to be joined to another array of fibres. A good connection between the fibres is required in order to reduce insertion losses. In practice, it is difficult to achieve this, particularly where more than one optical fibre is involved. Optical fibres often provide inputs to devices in which the light from the input fibres are directed to one or more output fibres via an intermediate arrangement. The intermediate arrangement may comprise one or more components such as a lens or a diffraction grating or a beam steering element. This type of product suffers from the same problems.

It is therefore an aim of embodiments of the present invention to address this problem.

According to one aspect of the present invention, there is provided a optical device comprising a core portion having a first refractive index, said core being arranged to permit a light beam to travel therethrough; and an outer portion having a plurality of different refractive indices along a longitudinal axis of the device, said refractive indices being such that the light beam is arranged to travel along said device.

According to a second aspect of the present invention, there is provided a method of manufacturing an optical device as claimed in any preceding claim, wherein said outer portion is arranged to be sensitive to a predetermined type of electromagnetic radiation, said method comprising radiating said outer portion with said predetermined type of electromagnetic radiation to thereby provide said plurality of different refractive indices in said outer portion.

According to a third aspect of the present invention, there is provided a fibre holder joining a plurality of optical devices, said connector comprising a first relatively thin plate and a second relatively thin plate, said first and second plates being separated by a relatively thick layer, said first and second plates having a plurality of holes therethrough for accommodating said optical devices and said thick layer also having a plurality of holes therethrough for accommodating said optical devices, wherein the holes through the first and second plates are smaller than those through the thick layer.

For a better understanding of the present invention and as to how the same may be carried into effect, reference will now be made by way of example to the accompanying drawings in which.

Figure 2:
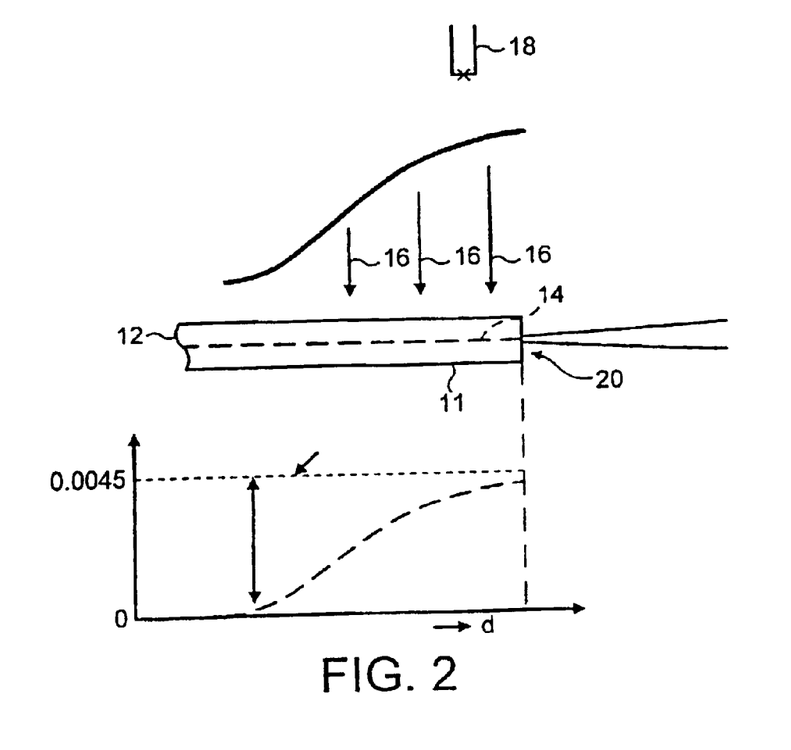
FIG. 2 illustrates a first method embodying the present invention.

Reference will first be made to FIG. 2, which shows a first embodiment of the present invention. A fibre 12 has a core and inner cladding as shown in FIG. 1. The core is silica doped with alumina or any other refractive index changing dopant. It should be appreciated that the core can be of any suitable material. However, in preferred embodiments of the present invention, the core is not photosensitive. However, it should be appreciated that in some alternative embodiments of the present invention, the core may be photosensitive.

The inner cladding is again silica which has been doped with a photosensitive material such as germanium and possibly boron and/or fluoride to alter the net refractive index of the cladding to the required initial refractive index. It should be appreciated that in embodiments of the present invention, the cladding can be of any suitable material which is photosensitive, for example, phosphorous or any other material. In preferred embodiments of the present invention, the cladding is photosensitive with respect to ultra violet radiation. However, in alternative embodiments of the present invention, the cladding may be photosensitive to other frequencies or may be sensitive to other types of radiation. To avoid difficulties, the cladding is preferably not sensitive to the frequency of the radiation, which is to travel along the core of the optical fibre.

As can be seen from FIG. 2, the fibre has a longitudinal orientation represented by axis 14. The end region 11 of the fibre 12 is radiated with UV radiation in a direction perpendicular to the longitudinal axis 14 of the fibre 12. This is represented by the arrows referenced 16.

The source of the UV radiation can be any suitable source. However, in preferred embodiments of the present invention, the UV source is provided by a laser 18. The laser 18 can be of any suitable laser but in preferred embodiments of the present invention is a copper vapour laser. The copper vapour laser has been found to be preferable to other types of laser in that it has a high average power but a medium peak power. Frequency doubled copper vapour lasers are able to achieve this as they have a relatively high pulse repetition rate. One example of a copper vapour laser is one manufactured by Oxford Lasers. Of course in other situations, other types of lasers may be appropriate.

In one embodiment of the present invention, the time-averaged distribution of the UV radiation applied is approximately, to the first order, Gaussian. In other words, the end of the fibre 12 receives the greatest amount of UV radiation with the radiation received by the fibre 12 decreasing according to the Gaussian distribution with increasing distance from the end of the fibre. Any other distribution can be alternatively used which preferably provides a levelled out middle part on the beam and a beam tail which tends to zero. For example a cosine type intensity variation can be used or part of the cosine shape. The beam may be in the form of a parabola. The slope tending to zero can be linear, non linear, steep or shallow. Likewise the portion around the highest intensity can also be linear, non linear, steep or shallow.

By irradiating the fibre with UV light, a change occurs to the molecular state of some of the molecules in the cladding. This change alters the properties of the cladding and, in particular, its refractive index. This can be seen from the graph of FIG. 2 which shows the local refractive index of the core and inner cladding relative to the refractive index of the cladding far from the end of fibre. At the end 20 of the fibre 12, as can be seen from the graph, the difference between the refractive index of the core and the cladding is very small whilst further along the fibre, the difference is relatively large and of the order of 0.0045. As the refractive index difference at the end of the fibre is relatively small, the beam spot size is increased. This is because the effective diameter of the core is increased to that of the core plus the inner cladding.

By increasing the beam spot size, a number of advantages can be achieved. In particular, when the fibre 12 is joined to another fibre, the increased beam spot size makes it easier to join the fibres without unacceptable insertion losses occurring. This means that the tolerances are effectively increased making the assembly costs decrease and the reliability of the connection increase.

As is well-known to those skilled in the art, it is advantageous to soak the glass in some form of high-pressure hydrogen prior to UV exposure, as the presence of hydrogen diffused into the glass matrix is known to increase by a very significant amount the photosensitivity of the glass, and hence both the rate of change of the refractive index and the ultimate achievable change in refractive index. Preferably the form of hydrogen used should be deuterium, in order to avoid the introduction of an excess 'water peak' leading to increased absorption at telecomms wavelengths close to 1500 nm. This is important in order to minimise the excess insertion loss introduced by using the device in optical systems.

In embodiments of the present invention, the fibre can be irradiated on only a part of the circumference thereof. However, in alternative embodiments of the present invention, the fibre may be radiated on all sides. This may be achieved by moving or rotating the laser beam and/or by moving or rotating the fibre. The refractive index of the fibre can be uniformly changed or non uniformly changed. In the latter case an elliptical distribution may be achieved or any other suitable distribution.

In preferred embodiments of the present invention, the fibre is a single mode fibre. However, in alternative embodiments of the present invention, the fibre may have more than one mode.

In the preferred embodiment of the invention, the spot size is increased by four times. The spot size may be increased by less than this or more than this in alternative embodiments of the present invention.

The effect of the UV radiation is to provide an up taper in the refractive index of the cladding such that the fundamental mode expands adiabatically as it travels along the taper to form a near field at the fibre end with a significantly increased spot size as compared to an untreated fibre. In some experimental results, the transverse offset between two standard fibres (with "dispersion zero" centred at 1300 nm) resulting in a 0.2 dB insertion loss must be less than 1.16 micrometers. In contrast, in an embodiment of the present invention where the beam spot is increased by a factor of 4, the transverse offset can be around 4.2 micrometers for the same loss. In other words, the two fibres can be out of alignment in the direction perpendicular to the longitudinal axis by 4.2 micrometers in embodiments of the present invention and still only incur at 0.2 dB loss.

Figure 6:
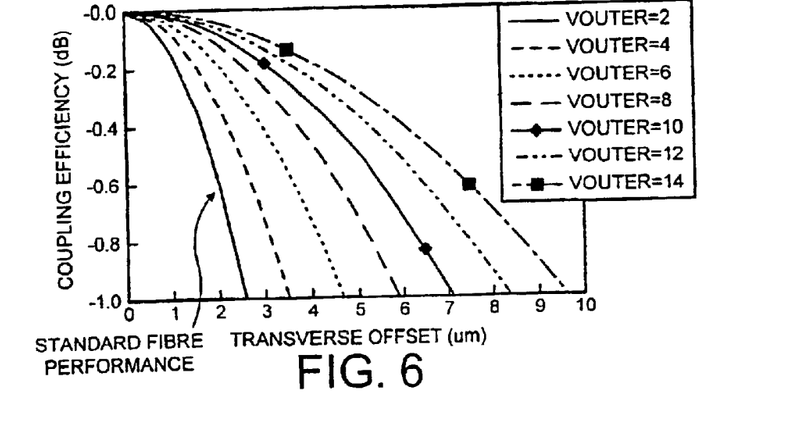
FIG. 6 shows a graph of coupling efficiency against transverse offset for a known optical fibre and fibres embodying the invention.

Reference will now be made to FIG. 6 which shows a graph of coupling efficiency versus a transverse offset in micrometers for the local or fundamental mode at the end of the taper. This assumes that the index of the inner cladding has been increased to match that of the core. Results are plotted for various different outer radii of the outer cladding. The curve for Vouter equals 2 shows the performance for an unmodified standard fibre where Vouter is:

$$Vouter = \frac{2\pi q}{\lambda} \times \sqrt{(n_{CO}^2 - n_{CL}^2)}$$

q=radius inner cladding/outer cladding boundary
$n_{CO}$=refractive index of the core.
$n_{CL}$=refractive index of the cladding
$\lambda$=the wave length of light.

In the case of the unmodified standard fibre, the error in the transverse position must be kept below 1.2 micrometers to maintain an insertion loss penalty of 0.2 dB or less, as discussed above. In practice, this may be achievable for single fibre connectors but may be difficult to achieve for multi-fibre connections arranged in one dimensional arrays and virtually impossible for two dimensional fibre arrays. For the highest value of Vouter equals 14, the equivalent spot size is around 20 micrometers (as opposed to around 5 micrometers for the standard fibre) and the tolerance in the transverse position increases to 4.2 micrometers for the same insertion loss penalty of 0.2 dB. The equivalent unmodified standard fibre at such a transverse offset would have an insertion loss of around 2.7 dB which would be unacceptable.

The graph shown in FIG. 6 thus shows different values for V outer. As can be seen from the graph, by increasing Vouter, the tolerance in the transverse position increases.

The greater transverse offset permitted in embodiments of the present invention means that the tolerances of the system are much improved over the prior art. This makes it easier to connect the fibres, requiring less precision.

Figure 7:
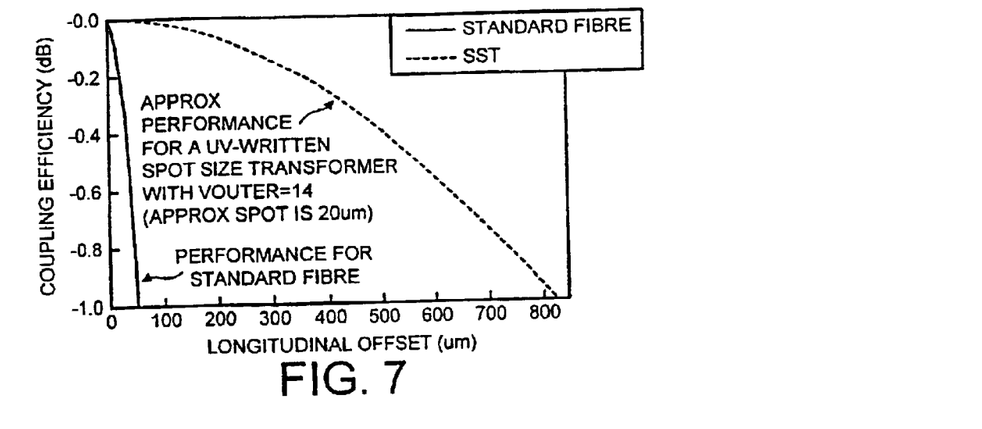
FIG. 7 shows a graph of coupling efficiency against longitudinal offset for a known optical fibre and a fibre embodying the invention.

Reference is now made to FIG. 7 which shows a graph of the coupling efficiency versus the longitudinal offset. The standard fibre shown with the solid line is an unmodified fibre whilst the dotted line shows the performance of a fibre embodying the present invention with a Vouter size of 14. The approximate size of the spot is 20 micrometers. For a unmodified fibre having a spot size of around 5.1 micrometers, the longitudinal alignment error should be kept below 30 micrometers to maintain an insertion loss below 0.2 dB. For multi-fibre connectors, this alignment error is the length of the air gap between two facing ribbon fibres. As can be seen from the graph, for a spot size of 20 micrometers the tolerance in the longitudinal position is increased to 350 micrometers for the same insertion loss of 0.2 dB. In a multi fibre connector, the net effect would be to decrease the variability of the connection loss between successive matings, to decrease the mean loss and also to increase the device lifetime in terms of the number of connections and disconnections which can be performed before it wears out and the connection loss becomes unacceptable.

In optical systems using the known technology, where an intermediate arrangement is provided between input and output fibres, the longitudinal position of the fibres often has to be adjusted to compensate for focal length errors. As can be seen from the graph shown in FIG. 7, the embodiments of the present invention may remove the need to monitor and adjust for the longitudinal alignment for such systems. The systems may be less sensitive to chromatic aberrations and/or less sensitive to thermal changes, uniform or non uniform.

Figure 8:
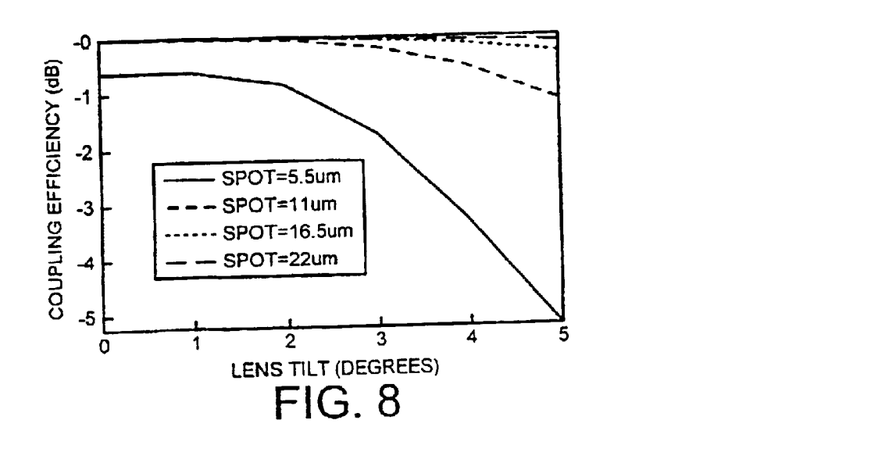
FIG. 8 shows a graph of coupling efficiency against lens tilt for a known optical fibre and a fibre embodying the invention.

Reference is made to FIG. 8, which shows lens tilt v coupling efficiency for a standard catalogue lens with a focal length of 25 mm. Lens tilt is the amount by which the rotational axis of symmetry of the lens differs from the longitudinal axis of a fibre input to a lens. The lens is used in the intermediate arrangement of the optical systems discussed previously. The calculation assumes a reflective 2f system for the intermediate arrangement. It should be appreciated that a spot size of 5.5 micrometers represents that of a standard fibre. The spot sizes of 11, 16.5 and 22 micrometers are achieved with different embodiments of the present invention. As can be seen, the standard fibre has the worst coupling efficiency, which gets worse as the lens tilt increases. The beam having the spot size of 22 micrometers has the best coupling efficiency with a coupling loss of only around 0.1 dB. As can be seen, the fourfold increase in the spot size results in a fourfold decrease in the beam divergence making the optical beam steering system much less sensitive to lens aberrations and lens and fibre array tilts. As can be seen from this graph, the fundamental loss penalty disappears and this is maintained across a wide range of lens tilts thus removing the need to monitor and adjust the lens tilt.

It is known in semiconductor technology that spot size conversion can be achieved by physically tapering the wave guide core using standard fabrication techniques and this is used to improve the alignment tolerances for coupling between lasers and amplifiers and single mode fibres. However, in fibre technology, a taper in the core size results in a change in the fibre outer diameter. This is difficult to control accurately. This is in contrast with embodiments of the present invention, which permit the taper to be achieved by altering the refractive index. It is therefore preferred in embodiments of the present invention that the outer dimensions of the fibre are unchanged. This means that the fibres can be incorporated in one or two dimensional fibre arrays or connectors at the modified end of the fibre. This also means that the fibre is compatible for splicing purposes with normal or standard fibres at the unmodified end as well as the modified end.

It should be appreciated that in embodiments of the present invention, the equivalent effect to a down taper in the core size may also be achieved. This may require the core to have a central photo sensitive region and an outer non photo sensitive region surrounded by a photo sensitive inner cladding. The refractive index of the inner cladding in the unmodified region substantially equals that of the outer layer of the cladding. The effect of the irradiation would be to increase the refractive index of the inner cladding substantially to that of the outer core and raise the refractive index of the inner core to above that of the outer core.

In the known arrangements which achieve up taper and down taper by altering the size of the core, the up taper generally is advantageous as compared to the down taper, particularly in one dimensional and two dimensional fibre arrays used for beam steering. As the core size is decreased below its normal value to provide a down taper, the evanescent field spreads out rapidly. This leads to an increased susceptibility to cross talk from beams directed at adjacent fibres. The overall beam shape also becomes very much less like a Gaussian distribution. Accordingly, for the same spot size in the collimated far field, the beam divergence is much greater. This limits the propagation distance inside a beam steering system and hence the scalability. The opposite effects occur for an up taper in the core size, that is an increase in the core size. A fibre down taper in the core size is straight forward to make whilst a fibre up taper is very difficult. In contrast, the method proposed in embodiments of the invention is able to achieve an equivalent effect to an up taper in the core size simply. As will be discussed in more detail hereinafter, this is advantageous for beam steering and multi fibre connector applications and optical devices having the intermediate arrangement discussed previously. Thermal diffusion of the core dopant has been used to create a refractive index taper inside the fibre. However, this technique is difficult to implement and the improvements which can be achieved are small. Typically, the spot size can be increased by a factor of 2 but not much more than this.

In contrast, embodiments of the present invention allow the index change to be easily controlled and to such an extent as to allow the spot size to be increased by a relatively large factor. It is envisaged that embodiments of the present invention could allow the spot size to be increased by a factor of 5 or more.

A further advantage of embodiments of the present invention, is that by changing the relative refractive index between the core and the inner cladding, the effective core size of the fibre increases thus reducing cross talk in an array of fibres. The array may be a one dimensional or a two dimensional array.

It should be appreciated that the profile of the ultra violet light applied to the fibre in FIG. 2 can be altered so as to provide any desired profile for the refractive index difference. For example, the refractive index difference may increase at the end of the fibre or may be uniform along a portion of the fibre. This is controlled by controlling the intensity of the ultra violet radiation on different parts of the fibre.

In alternative embodiments of the present invention, the distribution of photosensitive particles in the silica may be controlled so that uniform ultra violet radiation may be used to generate the required refractive index profile.

Alternatively, the distribution of the dopants may have a longitudinal and/or radial or transverse variation.

Figure 3:
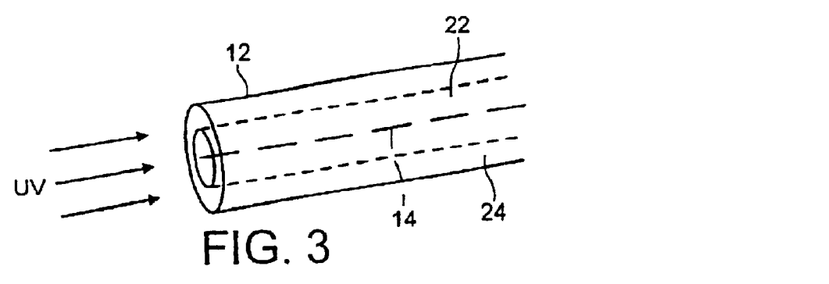
FIG. 3 shows a second method embodying the present invention.

Reference is made to FIG. 3 which shows a second embodiment of the present invention. In this embodiment, the fibre 12 has a core 22 and an inner cladding 24. Ultra violet light is incident on the end of the fibre 12 and is parallel to the longitudinal axis 14 of the fibre. Due to the absorption of the incident light by the germania molecules, the intensity of the ultra violet light is thus greatest at the end of the fibre and will decrease as the ultra violet light propagates down the fibre. With this technique, it is possible to have the smallest refractive index difference between core and inner cladding at the end of the fibre with an increasing refractive index difference further from the end of the fibre.

Figure 4:
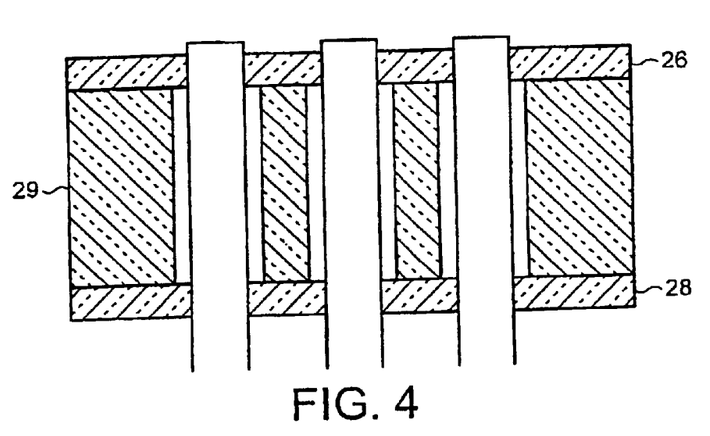
FIG. 4 shows a cross section through a connector or fibre array embodying the present invention.

Reference will now be made to FIG. 4, which shows a preferred embodiment of the present invention for making a one or two dimensional fibre array or connector. The structure comprises first and second outer layers 26 and 28 respectively. These outer layers are relatively thin and typically have a thickness of between 100 micrometers to 600 micrometers. It should be appreciated that alternative embodiments of the present invention may use other thicknesses for the sheets. The outer sheets 26 and 28 are ceramic sheets. Ceramic material is advantageous as it has a low thermal expansion and allows a high packing density. The two very thin sheets 26 and 28 are drilled together, at the same time. In particular, holes are drilled in these sheets through which optical fibres will extend. The ceramic sheets are drilled accurately, for example with the Oxford Lasers' copper vapour laser. Typically, this laser can achieve a centering accuracy of 2 micrometers for an array of holes drilled across a 25 mm square substrate. The accuracy of the hole diameter will decrease with a thickness of the ceramic sheets. For example, the accuracy will be between plus or minus 0.25 micrometers for a 100 micrometer sheet to between plus or minus 3 micrometers for a 600 micrometer sheet.

Between the two layers 26 and 28 is a middle layer 29. The middle layer 29 is again of a ceramic material. The ceramic material has holes drilled there through in order to accommodate the fibres. The middle layer is typically much thicker than the outer layers and may be for example of the order of a millimeter. The holes drilled through the middle layer are typically bigger than those drilled through the outer layers. The outer layers are therefore provided to control the transverse position of the fibres whilst the middle layer is provided to suppress tilting of the fibres. Because the spot size of the beam is increased due to the index taper, the accuracy of the position and size of the holes in the two layers 26 and 28 can be reduced. In particular, it is now possible to provide a two dimensional array with the required accuracy. For example, with conventional fibres, the accuracy provided by the Oxford Lasers' laser would not be high enough to achieve the required accuracy for a 32 by 32 fibre switch. However, by increasing the spot size by a factor of 4, in embodiments of the present invention, this is equivalent to a centering error of plus or minus 0.5 micrometers for a standard fibre. This leaves a further margin for non-concentricity, outer diameter and other errors. Embodiments of the present invention hence make it possible to provide two dimensional fibre arrays used for switching and connector applications or any optical device having an intermediate arrangement.

By using the very thin sheets for the outer layers, it is possible to provide the transverse accuracy. The middle layer is thus able to suppress the tilt.

The decrease in sensitivity to the accuracy of alignment of embodiments of the present invention means that larger arrays can be achieved with embodiments of the present invention as compared to the known techniques.

Figure 5:
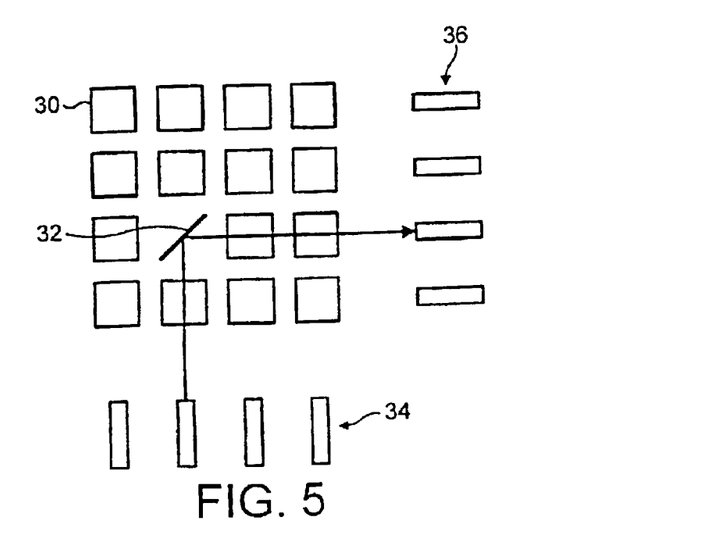
FIG. 5 shows a micro-electromechanical device embodying the present invention.

Reference is now made to FIG. 5, which shows a micro electro mechanical system switch which can advantageously embody the present invention. Large optical switches are generally used in telecommunication networks for restoration and wavelength routing. It has been suggested that for a high number of ports, only free space "beam steering" switches can provide a sufficiently low cross talk so as to suppress homodyne beat noise. Micro electrical mechanical systems are attractive as they are amenable to mass production and low cost manufacture. However, there have been some problems in addressing the packaging of the elements Embodiments of the present invention are able to address this difficulty.

A micro electrical mechanical system comprises a plurality of inputs 34, which are typically optical fibres and a plurality of outputs 36 which again are typically optical fibres. The input and/or output fibres 34 and 36 embody the present invention. The switch itself comprises an array of mirrors. The array has mirrors equal to the number of inputs 34 multiplied by the number of outputs 36. Typically the number of inputs will equal the number of outputs. The mirrors are movable between two positions, a flat position, such as mirror 30 and a switching position such as mirror 32. When the mirror 32 is in the switching position, an input beam is directed to a corresponding output. Embodiments of the present invention are able to improve the tolerance to errors in the positions of the fibres and micro-lenses. Accordingly, embodiments of the present invention allow an array of a size of 32 by 32, or greater, to be realistically achieved.

In preferred embodiments of the present invention, both the inputs and the outputs would be effectively up tapered towards the end of the fibres. Embodiments of the present invention also would allow the beam divergences to be decreased which allows a better collimation system. In particular, a lens will be provided between the output of each input fibre and the mirrors. A lens will also be provided at the input to each output fibre from the mirrors. A GRIN lens may be used.

Embodiments of the present invention can also be used with other configurations of the micro electric mechanical switch which are two dimensional. In other words, a parallel layer of inputs, outputs, and mirrors would be provided. This is because the arrangement, such as shown in FIG. 4 allows an accurate two dimensional fibre array to be achieved.

It should be appreciated that the increase in the spot size achieved by embodiments of the present invention allows accurate two dimensional fibre arrays to be achieved using arrangements other than that shown in FIG. 4.

As will be apparent from the discussions hereinbefore, there are a number of different situations in which embodiments of the present invention can be used.

Embodiments of the present invention may be applicable to optical fibres made with the modified chemical vapour deposition process. However, it should be appreciated that embodiments of the present invention can be used with fibres made according to any other suitable technique.

Embodiments of the present invention can make use of the saturation effect. In other words, the UV light incident on the end of the fibre alters the refractive index by a certain amount and after that point, no further change in the refractive index is possible, regardless of whether or not the fibre continues to be irradiated.

Using this effect, it is possible to achieve the required refractive index a given distance from the end of the fibre by irradiating for a predetermined time without changing the refractive index at the end by more than a given factor. This effect may be particularly useful with the embodiment shown in FIG. 3 but may also be used with the embodiment shown in FIG. 2.

Figure 9:
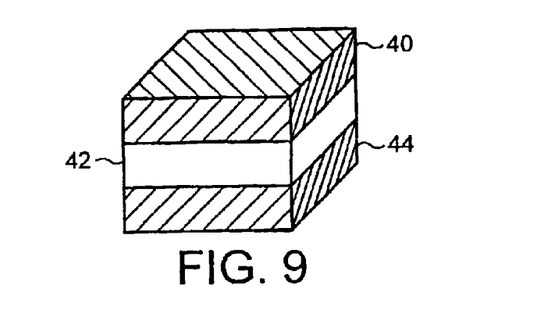
FIG. 9 shows a wave guide embodying the invention.

Embodiments of the present invention have been described in the context of a fibre. However, embodiments of the present invention can also be used with other types of wave guide, an example of which is shown in FIG. 9. FIG. 9 shows a dielectric slab wave guide having a first layer 40, a second, middle layer 42 and a third layer 44. Layer 42 is equivalent to the core of the fibre shown in the previous embodiments whilst layers 40 and 44 are equivalent to the inner cladding. The layers 40 and/or 44 may be irradiated with ultra violet light so as to modify the refractive index difference along part or all of the length of the wave guide. It should be appreciated that the light beam will travel through layer 42.

Embodiments of the present invention can be used with any other type of wave guide and not just the slab wave guide shown in FIG. 9.

Embodiments of the present invention are thus able to improve the transverse tolerance. This makes it easier to connect a fibre in accordance with embodiments of the present invention to other fibres or connectors. The other fibres may also be fibres in accordance with the present invention.

Methods embodying the present invention are particularly advantageous when applied to an array of connectors. The transverse offset tolerance is increased with embodiments of the present invention. This makes one or two dimensional arrays of connectors easier to manufacture. Additionally, the manufacturing costs are reduced as the arrays are less sensitive to errors.

Figure 11:
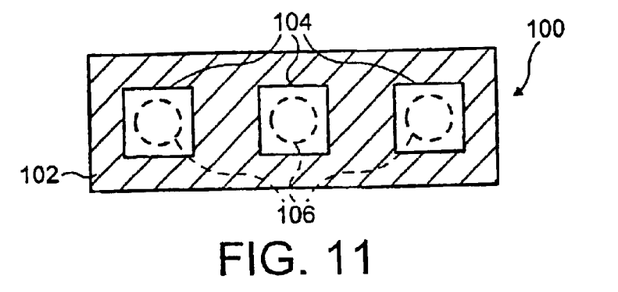
FIG. 11 shows how a fibre pigtail is attached to a wave guide.

Embodiments of the present invention can be used to join a fibre pig tail to the end of a silicon wave guide 100. Because of the reduced sensitivities to errors, such as the transverse offset and the longitudinal offset it is easier to join the wave guide to the fibre pigtail. The wave guide has three "cores" or channels 104 to which the cores 106 of the fibres are joined. For clarity, the cores are shown in dotted lines. It should be appreciated that in practice any number of cores can be provided and not just three. The channels are surrounded by a cladding layer 102.

As discussed previously, embodiments of the present invention allow two dimensional fibre arrays to be achieved more easily in that the tolerance to location errors of the fibres are reduced by embodiments of the present invention.

Figure 10A:
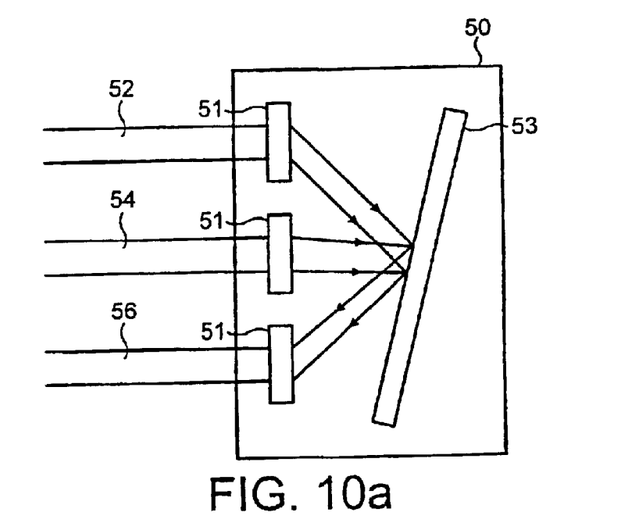
FIG. 10a shows a multiplexer embodying the invention.

Embodiments of the present invention can be used with wavelength multiplexers or demultiplexers. In particular, FIG. 10a shows schematically a wave length multiplexer 50 which receives a first fibre input 52 and a second fibre input 54 and provides a single output 56. The fibres are each connected to a lens 51. Two of the lenses 51 direct light from the input fibres to a diffraction grating which directs light to the lens associated with the output fibre 56. Embodiments of the present invention allow a more efficient multiplexer to be achieved as compared to the prior art. In particular, the reduced sensitivity to transverse offsets means that the insertion losses between either of the input fibres 52 or 54 and the output fibre 56 is reduced. The channel bandwidth may also be increased. The longitudinal tolerance is also improved.

Figure 10B:
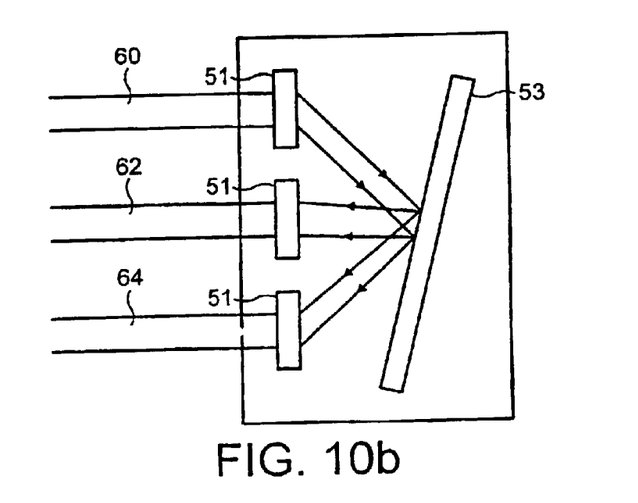
FIG. 10b shows a demultiplexer embodying the invention.

FIG. 10b schematically shows a demultiplexer 58 embodying the present invention. The demultiplexer has a single fibre input 60 and two output fibres 62 and 64 respectively. The demultiplexer 58 allows the input fibre 60 to be connected to either of the output fibres 62 and 64. The demultiplexer includes a similar arrangement of lenses and diffraction grating as shown in FIG. 10a. As with the multiplexer 50, embodiments of the present invention allow a more effective demultiplexer to be achieved as compared to the prior art. Again, this is because embodiments of the present invention provide a reduced sensitivity to transverse offsets resulting in a greater coupling efficiency as compared to the prior art and/or a reduced need for accuracy. Again the channel bandwidth is increased and the longitudinal tolerances improved.

As discussed previously, embodiments of the present invention are particularly useful with micro electrical mechanical systems and in particular may allow larger arrays to be achieved more realistically than with the current fibres. As mentioned, embodiments of the present invention are much less sensitive to lens tilt.

It should be appreciated that embodiments of the present invention also reduce the longitudinal tolerances associated with joining together of two fibres or the joining together of two wave guides.

Embodiments of the present invention can be used with high packing density arrangements. In order to achieve a high packing density, the fibres or wave guides embodying the present invention can have at least one tight bend in order to fold the fibre or wave guide into a confined space. The tighter the bend, the greater the packing density. For bends, a higher refractive index should be provided in the core. This can be achieved with embodiments of the present invention where a higher refractive index can be obtained in the core at the bends via ultra violet radiation.

Embodiments of the present invention can be used with wave guide arrays. A higher refractive index in the cladding can be provided before and/or after bends to counter the reduction in size of the beam introduced by a high core refractive index at the bend. This higher index in the cladding can be at the bend or alternatively down stream of the bend. This can be used to suppress coupling effects introduced by the bend where the single mode waveguide may act as a multimode waveguide. The change in the refractive index may be done in the plane in which the wave guide bends. The core size may be tapered down. Whilst embodiments of the present invention have been described in the context of optical fibres having inner and outer cladding layers, embodiments of the present invention are also applicable to optical fibres having only one cladding layer. Embodiments of the present invention can additionally or alternatively be applied to the outer cladding layer if provided.

Figure 12:
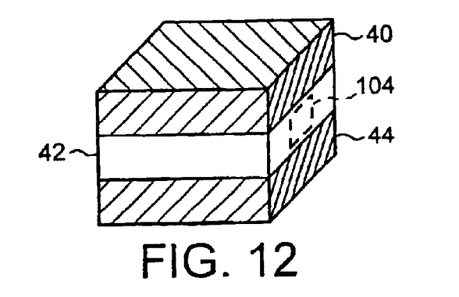
FIG. 12 shows how slab and channel wave guides can be connected.

FIG. 12 shows schematically part of a channel wave guide 100 in dotted lines for clarity such as shown in FIG. 11 joined to a slab wave guide such as shown in FIG. 9. The channel 104 of the channel wave guide only is shown for clarity. The beam width of the channel wave guide measured in the vertical direction is typically smaller than the corresponding beam width of the middle layer of the slab wave guide, therefore by increasing the spot size in the channel wave guide mismatch losses can be reduced. The vertical beamwidth of the slab guide can be better matched to that of the channel wave guide. This is particularly advantageous for arrayed wave guide gratings.

The increased transverse tolerance can be useful in beam steering devices which have a phase modulation array between input and output fibres. Embodiments of the invention result in the beam steering system having a greater wave length range. This is again a consequence of the increase spot size.

In preferred embodiments of the present invention, the concentration of germanium or the like is substantially constant along the length of the fibre or the wave guide. The refractive index profile varies with length adiabatically and over a length of order millimeters to tens of millimeters.

The optimisation of a device constructed in accordance with the present invention is given hereinbelow.

The physical phenomena that give rise to an index change also give rise to depletion of the light causing the index change. Hence it is likely that the outer regions of the fibre cross-section will receive more light, and hence change more in refractive index, than the inner regions of the fibre cross-section. The consequences on the fibre performance, and ways of both combating and harnessing such effects, are discussed hereinafter.

Figure 13:
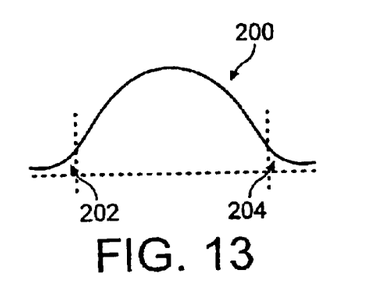
FIG. 13 illustrates a desired shape.

This concerns the shape of the fundamental mode at the free-space end of the taper. What is required is a shape that is a smooth bump, with tight evanescent tails, as shown in FIG. 13. As can be seen, the profile has a smooth bump 200, and tight beam tails 202 and 204. Tight tails are advantageous since they lead to low cross-talk due to coupling from beams targeted at adjacent similar fibres in a fibre array or connector. In general the higher the fibre V-number, the tighter the tail. A smooth bump is advantageous because it means that the angular spectrum of plane waves is narrow, leading to a low divergence, which improves the scalability of the beam-steering device in terms of numbers of ports. Similarly a smooth bump should have an angular spectrum with minimal side-lobes which would otherwise lead to cross-talk and beam propagation losses. The evanescent tails lie within the cladding region of a normal optical fibre. In embodiments of the present invention, at the free-space end of the taper this region corresponds to the outer cladding. The bump lies within the core region of a normal optical fibre. In embodiments of the present invention, at the free-space end of the taper, the effective core consists of the original core and the photosensitive inner cladding.

Figure 14:
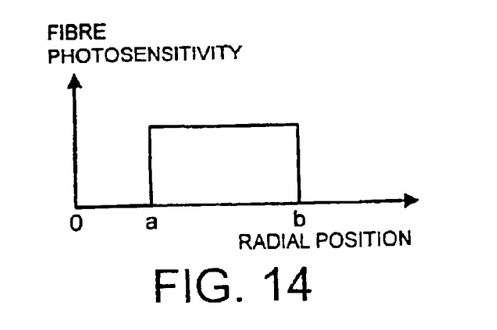
FIG. 14 illustrates photo-sensitivity characteristics for an example.

With reference to FIG. 14, it is assumed that the photosensitivity of the fibre takes some non-zero uniform value at all points within the annulus bounded by circles at radii of r=a and r=b respectively. Hence, within this region the absorption of the incident UV light will be uniform. A simplistic model for the index change, assuming rotation of the fibre to enable an index distribution independent of angle θ, is that the index change is exponential with decrease from b, as given in equation (N.1):

$$\Delta n(r) \sim \exp(-a(b-r))$$ (N.1)

Note: this model ignores conservation of energy

The behaviour can be deduced from the scalar wave equation, as given in equation (N.2):

$$\frac{1}{R}\frac{d}{dR}\left(R\frac{dF}{dR}\right) = V^2(b^* - s(R))F(R)$$ (N.2)

where R is normalised radius, =r/b, F(R) represents the electric field, b* is the normalised eigenvalue, V is the normalised frequency, and s(R) is the normalised shape of the refractive index profile. These symbols are well-known to those versed in the art of waveguide theory, and are defined in equations (N.3) to (N.5).

Note for R the outer radius is used, in contrast to the normal practice in the art, because at the free-space end of the taper the effective core radius has increased to this outer radius $$b^* = \frac{N_{EFF}^2 - N_{CL}^2}{N_{PK}^2 - N_{CL}^2}$$ (N.3)

$$V = \frac{2\pi b \sqrt{N_{PK}^2 - N_{CL}^2}}{\lambda}$$ (N.4)

$$s(R) = \frac{N^2(R) - N_{CL}^2}{N_{PK}^2 - N_{CL}^2}$$ (N.5)

where $N_{EFF}$ is the effective fibre index, that determines the phase velocity of the wave at wavelength λ, N(R) describes the refractive index as a function of normalised radius R, $N_{CL}$ is the refractive index of the cladding (outer cladding in this case), and $N_{PK}$ is the peak refractive index within the (effective) core region.

Figure 15:
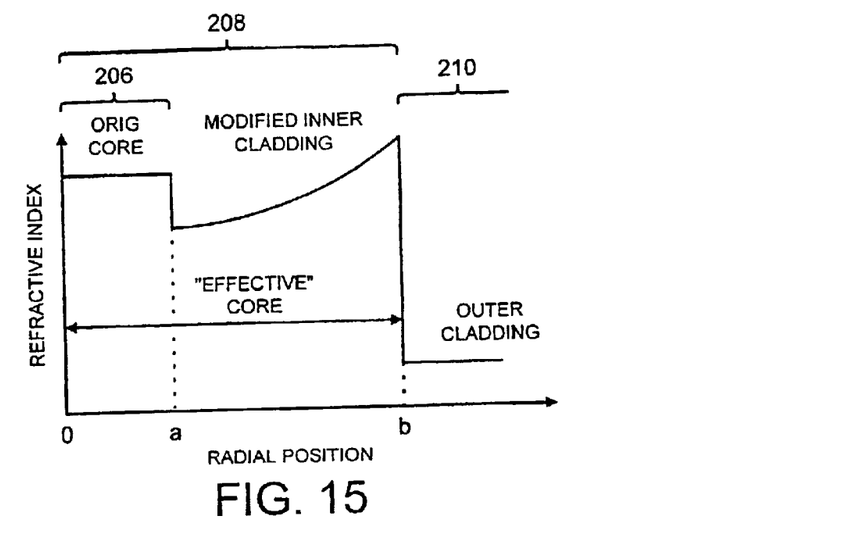
FIG. 15 shows an example fibre index at the end of a taper.

Assuming that the peak UV-written index is equal to that in the original fibre core, a sample normalised refractive index profile based on equation N.1 is shown in FIG. 15. FIG. 15 shows the fibre index at the end of the taper, assuming uniform photosensitivity. While the original core 206 is shown to have a uniform refractive index, throughout the rest of the effective core region 208 the index increases with radius. Te outer cladding is generally referenced as 210.

To investigate the effect on the shape of the bump, it is possible to integrate the wave equation directly to obtain equation (N.6):

$$R\frac{dF}{dR}\bigg|_{R=R2} = V^2 \int_{R=R1}^{R=R2} (b^* - s(R))F(R)R\,dR - R\frac{dF}{dR}\bigg|_{R=R1}$$ (N.6)

By considering equation (N.6) in the limits as R1 tends to zero and R2 tends to infinity, it is possible to obtain a simple expression for this normalised eigenvalue that shows how it depends on an averaged value of the normalised profile shape (s(R)), weighted with the product of radius (R) and the field distribution (F(R)) This expression is given in equation (N.7):

$$b^* = \frac{\int_{R=0}^{\infty} Rs(R)F(R)\,dR}{\int_{R=0}^{\infty} RF(R)\,dR}$$ (N.7)

For the fundamental mode, the field, F(R) does not change sign. This equation demonstrates that the normalised eigenvalue, b*, lies between 0 and 1. Now, consider equation (N.6), and set R1=zero, in which case the second term on the right-hand side of this equation is zero. Hence, without loss of generality it can be assumed to be positive. In the original core region s(R) is set to unity, and hence the integrand in equation (N.6) is always negative, since b can never quite reach unity. Therefore in this region the field is always decreasing with radius, which is what is required for a smooth bump.

Figure 16:
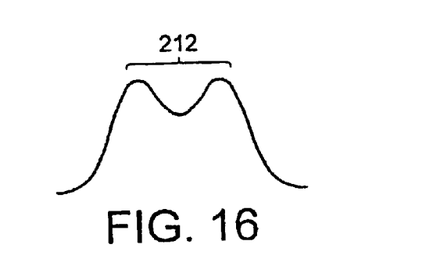
FIG. 16 illustrates an undesirable shape.

Now consider what happens in the UV-written region, again by considering equation (N.6) but setting R1 to a/b, in which case the second term on the right-hand side of the equation is the value of the product of the radius and field derivative on entering this region. For a smooth bump it is desired for the field derivative to remain negative. The integral, however, is likely to be positive, since b* is likely to exceed s(R). In which case R.dF/dR can become less negative and even change sign, leading to a field distribution as illustrated in FIG. 16. The field distribution has distortion 212 due to a positive index slope. Such a field distribution has significant side-lobes in the angular spectrum, and will be divergent, leading to poor performance.

As is well-known to those skilled in the art, the normalised eigenvalue, b*, increases monotonically with V number. Moreover, the effect on the field derivative is proportional to the square of the V number, as shown in the right-hand side of equation N.6. Therefore, the larger the V number, the worse these effects become. However a large V number is precisely what is required at the end of the taper, in order to obtain tight tails on the field distribution as well as expand the beam width. Therefore it is important to identify how to suppress this index slope.

Figure 17:
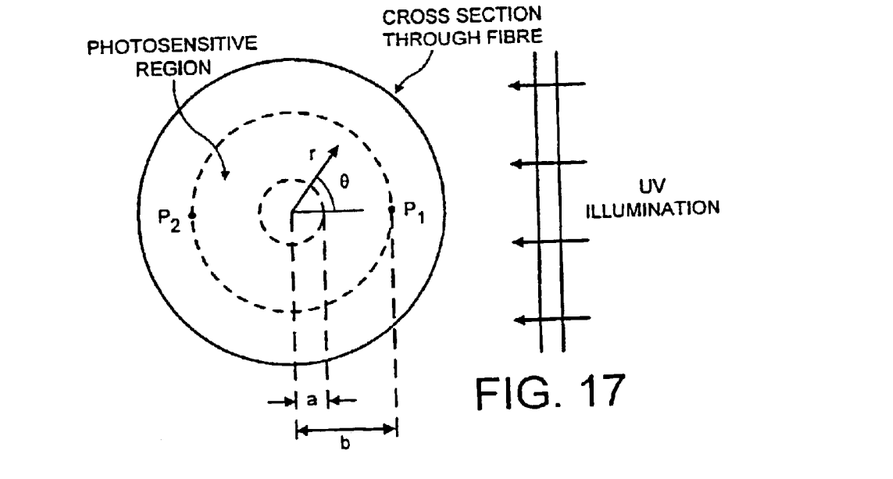
FIG. 17 shows a cross-section through an example fibre.

A technique for minimising distortion of the field distribution due to the index slope is discussed hereinafter. Given UV illumination from one side, the light reaching any point inside the fibre depends on how far it has travelled through the photosensitive region. For example, and with reference to FIG. 17, point P1 at co-ordinates (r, θ)=(b, 0) receives the full incident intensity, $I_{MAX}$, while point P2 at co-ordinates (r, θ)=(b, π) receives an intensity of $I_{MAX}\exp(-2\alpha(b-a))$. Given that in the linear regime, the index change is proportional to the incident intensity, this will result in a refractive index profile that varies with angle θ as well as with radius. The effect of rotating the fibre is such that, at any point, the time-averaged intensity is proportional to the average over θ. This has the effect of reducing the UV-written index variation across the fibre compared to that in equation (N.1).

Figure 18:
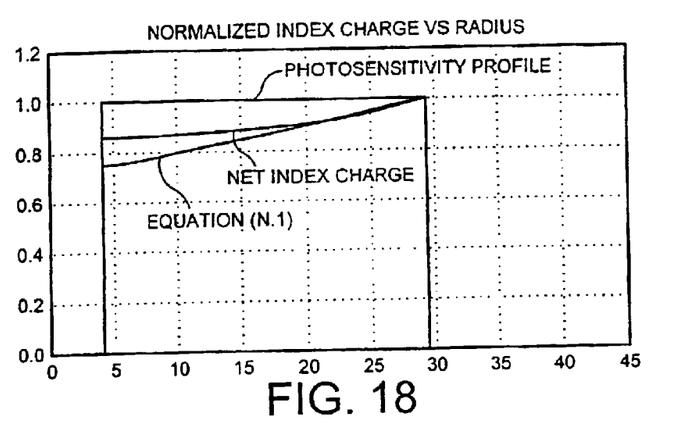
FIGS. 18 to 20 show graphs of normalised index change against radius.

FIG. 18 shows an example calculation of the index change calculated using the time-averaged intensity, for the case of uniform photosensitivity and therefore uniform UV absorption for all points within the annulus bounded by circles at radii of r=a and r=b respectively. FIG. 18 also shows the index change calculated using equation N.1. Therefore it can be seen that rotation of the fibre during UV illumination reduces the refractive index slope and hence improves the shape of the field distribution.

Another method to reduce the index slope is by changing the UV wavelength of the beam. In general the UV absorption decreases monotonically with wavelength for wavelengths above a peak at approximately 244 nm. Therefore by choosing a longer wavelength the value of a is decreased, and hence the index slope is reduced.

Figure 19:
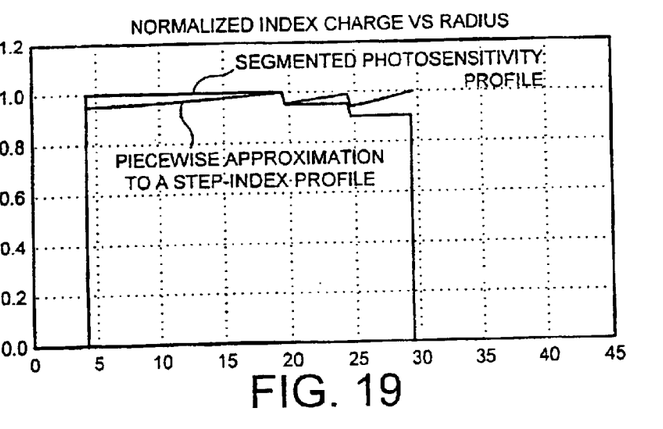

It is also possible to modify the radial photosensitivity profile of the cladding into a series of concentric tubular regions, each with a different but substantially uniform photosensitivity, created by suitable adjustment of the index dopants during their deposition at the preform stage of manufacture. In the linear regime, the index change in each region is proportional to the product of the photosensitivity and the time-averaged intensity, while the UV absorption is proportional to the photosensitivity. Preferably the photosensitivity should be increased for each successive tube closer to the optical axis. Hence although in each tube the index slope is positive, the aggregated index slope can be negative or constant, as required for the application. The results of a computer model used to test this technique are shown in FIG. 19. The photosensitivity of each region has been adjusted so as to obtain a piecewise continuous approximation to a step-index profile. As long as s(R) is always greater than b*, the field derivative will never change sign and it should be possible to ensure a smooth bump.

It should be appreciated that other methods for adjusting the photosensitivity distribution could be used so as to obtain the required index profile after UV irradiation.

It should also be appreciated that the index slope depends on the absolute as well as relative concentrations of photosensitive dopants within the glass.

A further advantage of using a piecewise continuous photosensitivity profile is that, for a given maximum allowable index slope, it allows a higher photosensitivity and therefore a reduction in the manufacturing time. Alternatively, it allows a wider photosensitive region, and therefore a larger spot size at the free-space end, since the spot size tends to be of the order of the effective core radius.

Methods to reduce the index slope may also be applied to advantage in the end-writing method (FIG. 3). In this case what is important is that the index should not change too rapidly in the longitudinal direction, so as to suppress coupling from the fundamental mode into higher-order modes as it travels along the taper. Preferably the index change should occur over a distance of between a mm or a few tens of mm.

A further method to reduce the sensitivity to the positive index slope is to change the profile shape so as to reduce the normalised eigenvalue b*. This may be achieved by reducing s(R) such that the index reduces substantially with radius at the outside of the inner cladding, leading to an overall shoulder-type profile.

A technique for optimising the amplitude of the UV-written index change relative to the index of the original core is discussed hereinafter. If the index of the UV-written region exceeds that of the original fibre core, then there is an effective positive index slope at the original core boundary. The normalised eigenvalue is then likely to be greater than s(R) at the centre of the fibre. This will cause the field derivative to start off positive, leading to gross field distortion. Conversely if the index of the UV-written region is significantly less than that of the original core, and the normalised eigenvalue is close to the normalised index of the inner cladding, there will be a small tight bump at the centre of the field. Such a tight bump will increase the width of the angular spectrum. Therefore the index of the modified inner cladding should match, as closely as required for the application, the index of the original core. The sensitivity of the field distribution shape to the index difference between the UV-written region and the original core may be reduced to advantage by decreasing the normalised eigenvalue, by, for example, creating a shoulder-type variation in index at the outside of the inner cladding. The sensitivity may also be reduced by decreasing the effective V number at the free-space end of the taper, as is described further hereinbelow.

Figure 20:
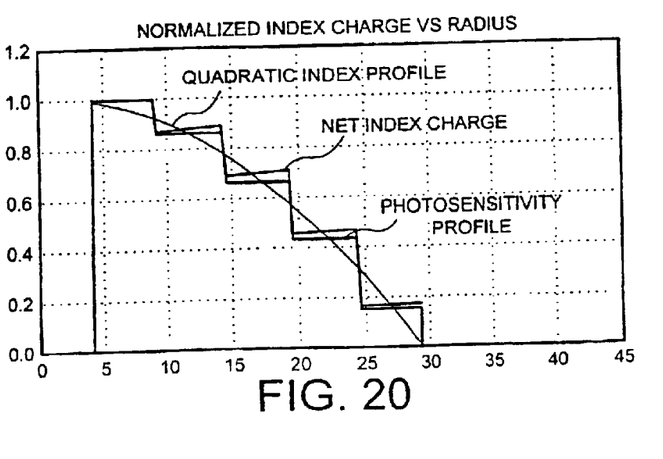

A technique for optimising the field distribution for long-distance beam-steering is described hereinafter A Gaussian field distribution is preferable for beam-steering applications, due to the low divergence, which improves the scalability of the beam-steering device in terms of numbers of ports, and due to the absence of side-lobes which would otherwise lead to cross-talk and beam propagation losses. As is well-known to those skilled in the art, an infinite parabolic index profile (with the maximum index at the centre) would give rise to a Gaussian fundamental mode. Hence the optimum index distribution at the free-space end of the taper (after UV writing) is such that the original core and inner cladding have a substantially parabolic refractive index profile, with the sign of the parabola such that the peak index is in the core. This could be achieved by continuous or piecewise continuous changes in the photosensitivity profile of the fibre inner cladding, created by suitable adjustment of the index dopants during their deposition at the preform stage of manufacture, or by any other method of adjusting the photosensitivity distribution. An example is shown in FIG. 20.

Figure 21:
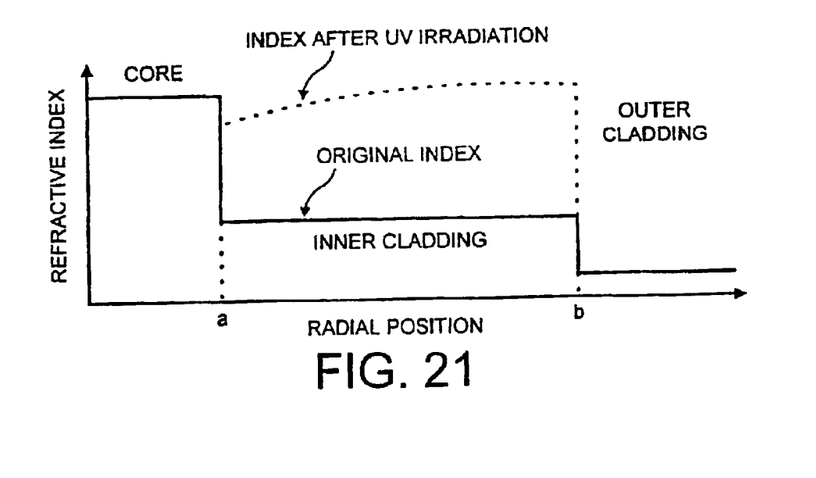
FIG. 21 illustrates an example of the refractive indices at points in the core, inner cladding, and outer cladding.

A technique for optimising the field distribution for fibre connectors and short-distance interconnects, which may also be applicable to WDM multiplexers/demultiplexers, is describer hereinafter. For fibre connectors the field does not propagate far. For this application it may be advantageous to use some positive index slope to flatten the field distribution around its centre. This makes coupling between such fibres less sensitive to transverse offset. High extinction/low coupling from adjacent fibres in the connector can be achieved by making the original fibre have a raised inner cladding, as shown in FIG. 21. Thus the UV-written index profile has a higher refractive index difference between effective core and outer cladding, increasing b* and tightening up the evanescent tails. While at the unmodified end of the fibre, however, the field does not perceive the outer cladding, and so is only sensitive to the index difference between the core and unmodified inner cladding.

There is described hereinafter a technique for optimising the inner cladding index dopants so as to improve the final accuracy of the monitoring process, and reduce the drop in index change after annealing and loss penalty. For the index profile at the unmodified end of the fibre to be perfectly compatible with standard fibre, the index dopants in the fibre inner cladding should preferably be germania to provide the photosensitivity, together with an index lowering dopant to bring the index down to match that of the outer cladding. There are two such candidates. Firstly boron, which tends to increase the photosensitivity very significantly, and secondly fluoride, which tends to lower the photosensitivity. Boron does have the disadvantage, however, of increasing the background loss of the fibre sufficiently to preclude the use of long lengths of such fibre. In practice this means that for many applications it would be necessary to have to splice on a length of standard fibre to the unmodified end of the index-tapered fibre. Secondly, boron, and especially hydrogenated boron, makes the index change decay much more with time and temperature, such that the index change that disappears during annealing is more significant, making calibration of the manufacturing process more problematic. Flouride does not change the background loss of the fibre very much, although it does tend to diffuse. Therefore, despite the lower photosensitivity, the use of fluoride to lower the index down to match the cladding may indeed be preferable to using boron.

A technique for optimising the final index profile so as to maximise the final spot-size is described hereinafter.

Gaussian approximations to the fibre mode are well known in the art. There are many definitions for the spot-size, ($\omega$o, but, independent of the definition, the normalised spot size ($\omega$/b for our purposes) depends on the shape of the refractive index profile. Hence, given a maximum value of b, the final index profile that maximises the final spot-size, $\omega$, is that which maximises the ratio $\omega$/b. Results in the art indicate that grading the 'outside' of the index profile, leading to a shoulder type profile, decreases the normalised spot size, while a central dip tends to increase the normalised spot size. Hence for some applications, what is required is a fairly step-like profile with a weak central dip which just flattens the field, but avoids the problem illustrated in FIG. 16.

A technique for optimising the original index distribution of the cladding, so as to maximise the final spot-size, is described hereinafter. As is well-known in the art, the normalised spot size tends to decrease with V number. Hence, by adjusting the outer cladding index so as to reduce the effective V number, it is possible to increase the normalised spot size and therefore increase the spot-size, given a fixed value of b. This may be achieved by raising the index of the outer cladding, or conversely, lowering the index of the entire inner cladding and the original core.

In the following discussion hereinbelow, there is discussed the combination of optical fibres in accordance with the present invention with beam-steering optical switches.

Beam-steering optical switches operate in 3-D and therefore allow massive interconnectivity, with many input and output ports. Typically such a switch consists of one or more fibre arrays, each carrying signals into or out from the switch fabric, and one or two arrays of beam-steering elements. Normally the beam leaving an input fibre is directed with a suitable optical system towards a beam-steering element, that changes the beam's direction of propagation.

Normally, every input fibre is associated with a particular input beam-steering element, and vice-versa. The beam then passes through another suitable optical system to a second 'output' beam-steering element, which then directs the beam through a suitable optical system to an output fibre. Normally, every output fibre is associated with a particular output beam-steering element, and vice-versa. Hence, the required change in direction introduced by the input beam-steering element is such that the beam is directed to the output beam-steering element associated with the required output fibre. The required change in direction introduced by the second beam-steering element is such that the beam is directed into the output fibre with optimum coupling efficiency. In practice there should also be some fine adjustment of the input beam-steerer so as to maximise the coupling efficiency at the output fibre. Suitable elements to implement the beam-steering are miniature adjustable tilt mirrors using MEMS (MicroElectroMechanical Systems) or Liquid Crystal On Silicon Spatial Light Modulators.

Figure 22:
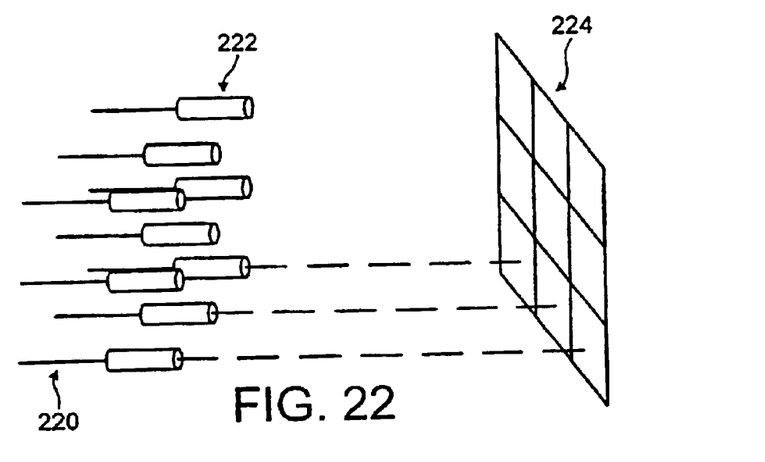
FIG. 22 shows an example beam-steering element array.

For MEMS systems, typically the optical system used between the fibre array and beam-steering element array is an array of GRIN lenses, as shown in FIG. 22. FIG. 22 shows a fibre array 220, a GRIN array 222, and an array of beam steering elements 224. The reason for using such a system is explained further hereinbelow. Such lenses tend to result in poor overall optical performance: as a single lens element they tend to exhibit significant chromatic aberration, such that there is a wavelength-dependent longitudinal offset between the focused output beam and the receiving end of the output fibre. This leads to a wavelength-dependent loss that reduces the overall wavelength range of the switch for a given optical alignment. Such lenses also tend to introduce significant spherical aberration, leading to distortion of the output spot and limiting the propagation length, and also increasing the spot size back at the output fibre. The limited propagation length constrains the overall size of the switch, and thus limits the numbers of ports that can be supported within a single switch fabric. Such lenses are also prone to poor manufacturing tolerances. Variations between the individual lenses in an array create variations in the longitudinal position of the output spot with respect to the output fibre. This can lead to significant insertion loss variations between switch ports.

As will be described hereinbelow, the use of optical fibres in accordance with the present invention in such switches allow an improvement in the optical performance, even using GRIN lenses. In addition, with the use of optical fibres in accordance with the present invention it is possible to enable changes in the optical system that make it cheaper, easier to align and better performing.

The use of optical fibres according to the present invention with GRIN or other microlenses is now described. An N-fold increase in the spot-size of a beam results in an N-squared factor increase in the Rayleigh length of the beam. As is well-known to those skilled in the art, a significant increase in the Rayleigh length of the fibre field distribution makes the coupling efficiency into a fibre very much less sensitive to longitudinal offset. Hence using optical fibres according to the present invention with GRIN lenses reduces the sensitivity to their chromatic aberration and manufacturing tolerances. Furthermore, an N-fold increase in the spot-size leads to a 1/N factor change in the beam divergence, so the beam should be much less affected by spherical aberration, allowing greater propagation lengths and less spot-broadening at the output fibre.

Similar problems (tolerances, spherical and chromatic aberration) apply to other types of microlenses, in which case a combination of optical fibres according to the present invention and microlens arrays will improve the optical performance.

Figure 23:
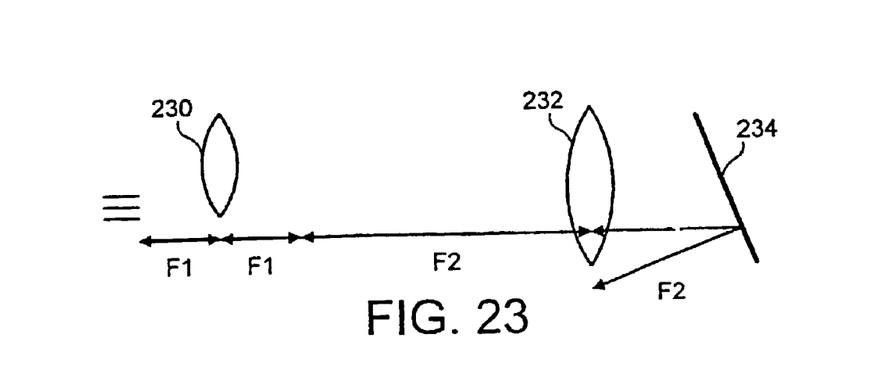
FIG. 23 illustrates an example of a beam steering array using con-focal lenses.

As is discussed further hereinafter, optical fibres according to the present invention allow use of telescopic systems between fibre arrays and beam-steering arrays, instead of microlens arrays, without unduly compromising the wavelength range (SLMs) and scalability (MEMS, SLMs for a given pixel pitch. Referring to FIG. 23, an alternative optical system for directing beams between a fibre array and beam-steering array 234 is to use a pair of confocal lenses 230 and 232 in a telescopic arrangement. Each fibre array is positioned at the input focal plane of the lens closest to it, while the output focal plane of the other lens is approximately midway between the arrays of beam-steering elements. The advantages of using such an optical system instead of an array of microlenses is that it avoids the need to align individual microlenses with each fibre, the lenses can be achromatic and well-corrected for other aberrations, and that the manufacturing tolerances on bulk lenses are much better than for microlenses.

In most cases it is desirable to reduce the required length, L, of the optical region between the beam-steering arrays, and also to reduce as much as possible the physical size of each beam-steering element. For a given spot-size, $\omega_{BS}$ at the beam-steering element, the lower limit to the element size is constrained by the need to avoid cross-talk due to clipping of the beam tails. Let the width of the beam-steering element, W, be a multiple C of the spot-size, i.e. W=C. $\omega_{BS}$. For MEMS switches used in such a system, for a given number of ports and given maximum deflection angle introduced by the tiltable mirror, the required mirror size is proportional to a function f of the clipping parameter C and of the ratio ($\omega/s$), where $\omega$ is the spot-size of the fibres in the fibre array, and s is the separation between the fibres in the fibre array. The particular function is shown in equation N.8:

$$f = \frac{C}{(\omega/s)\sqrt{1-(C\omega/s)^2}} \quad (N.8)$$

The optimum value of ($\omega/s$) that minimises the function f, and hence minimises both W and L is given by equation N.9:

$$\left(\frac{\omega}{s}\right)_{OPT} = \frac{1}{C\sqrt{2}} \quad (N.9)$$

For example, for C=3.4 the optimum value of the ratio $\omega/s$ is approximately 0.2. Typically the fibres in an array will have an outer diameter of 125 um, or sometimes 80 um, while the fibre spacing inside an array will have slightly larger values. Hence to optimise the element width and interconnect length, the required fibre spot-size is slightly larger than 27 um, and slightly larger than 16 um, respectively. However, standard telecommunications fibre has a spot-size of only approximately 5 um. Even TEC (thermally expanded core) fibre has a spot-size of only 10 um. Therefore optical fibres according to the present invention may be used in such a system to optimise the performance. Lower values of C can be used, so 3.4 is not the only possible value.

Furthermore, in a system using Liquid Crystal Over Silicon Spatial Light Modulators, the wavelength range is proportional to the ratio $\omega/s$. Therefore in some circumstances it might be preferable to use values of this ratio larger than the optimum for the element width and interconnect length, in order to increase the wavelength range. Hence optical fibres according to the present invention may be used to advantage in such switches in order to obtain a wide wavelength range.

Optical fibres according to the present invention may be used to improve resilience to cross-stalk, due to increased angular selectivity of the fibre. The effective tilt of the output beam-steerer can be used to optimise the tilt of the output beam directed towards the output fibre.

One side-effect of increasing the fibre spot-size is an increased sensitivity of the coupling efficiency to the angle of incidence of the incoming beam with respect to the fibre optical axis. In practise the tilt of the beam that is supposed to be steered to the output fibre can be adjusted to optimise this coupling efficiency. However, in an SLM switch there are likely to be one or more incoming beams at non-normal incidence, due to unwanted diffraction orders leading to cross-talk. The increased angular selectivity of the present invention improves the extinction of these cross-talk beams.

Thus it has been demonstrated that an optical fibre according to the present invention has significant advantageous applications. The application of the optical fibres according to the present invention is not limited to the examples given herein, and may be more widely applicable, as one skilled in the art will appreciate.

What is claimed is:

1. An optical fiber having a core, an inner cladding and an outer cladding on and surrounding the inner cladding, the cor having a core refractive index and being arranged to permit a light beam to travel therethrough and the inner cladding having an inner cladding refractive index, wherein in a first region the inner cladding refractive index has a first value, and the first value differs from the cor refractive index by an amount of the order of 0.0045 and in an adjoining region which includes a free-space end of said fiber, the inner cladding refractive index, changes along said fiber from the first value to a second value at the free-space end of the fiber, wherein the second value substantially matches the core refractive index, whereby the effective diameter of the core is that of the core plus the inner cladding at the free-space end.

2. The optical fiber of claim 1 wherein the outer cladding has a refractive index that is substantially said first value of refractive index.

3. The optical fiber of claim 1 wherein the outer cladding has a refractive index that is less than said first value of refractive index.

4. The optical fiber of claim 1 wherein the fiber is arranged to have a spot-size at said free-space end that is at least four times the spot size in said first region.

5. The optical fiber of claim 1, wherein the outer dimension of the fiber is unchanged along its length.

6. The optical fiber of claim 1, wherein fiber is arranged to be single mode fiber at least in its first region.

7. An optical fiber having a core, an inner cladding and an outer cladding on and surrounding the inner cladding, the core having a core refractive index and being arranged to permit a light beam to travel therethrough, wherein the refractive index of the inner cladding varies from a first value substantially equal to that of the outer cladding to a second value at a free-space end of the fiber, the second value substantially matching the core refractive index, whereby the effective diameter of the core is that of the core plus the inner cladding at the free-space end.

8. The optical fiber of claim 7, wherein the outer dimension of the fiber is unchanged along its length.

9. The optical fiber of claim 7, wherein the refractive index varies from said first value to said second value by an approximately Gaussian characteristic.

10. The optical fiber of claim 7, wherein the inner cladding is photosensitive.

11. The optical fiber of claim 7, wherein the inner cladding is photosensitive, said core has a center, and the photosensitivity of the inner cladding reduces with distance from the center of the core.

12. The optical fiber of claim 7, wherein the inner cladding comprises deuterium loaded germanosilicate glass.

13. An optical fiber having a core, a photosensitive inner cladding and a further cladding surrounding the photosensitive inner cladding, the core being arranged to permit a light beam to travel therethrough, the fiber having a first end zone in which the inner cladding has a plurality of refractive indices along a longitudinal axis of the fiber, the fiber further having a second end at which it is compatible with a standard telecommunications fiber, said refractive indices being such that in use the light beam travels along the fiber, the refractive indices defining a taper such that at a free-space end of the fiber the diameter of the core is increased to a enlarged core diameter equal to that of the core plus the Inner cladding; and whereby at said free-space end the fiber has a V number greater than that of a standard telecommunications fiber, wherein the outer dimension of the fiber is unchanged along its length.

14. The optical fiber of claim 13, wherein the inner cladding has refractive indices in the said zone which have an approximately Gaussian distribution between a minimum refractive index and a maximum, said maximum being at a free-space end of the fiber.

15. The optical fiber of claim 13, wherein said core has a center and the inner cladding has a photosensitivity which reduces with distance from said center of said core.

16. The optical fiber of claim 13, wherein the inner cladding comprises deuterium-loaded germanosilicate glass.

17. An array of beam-steering elements for steering light from an array of input fibers to an array of output elements wherein the input fibers each have a core, an inner cladding and an outer cladding on and surrounding the inner cladding, the core having a core refractive index and being arranged to permit a light beam to travel therethrough, wherein the refractive index of the inner cladding varies from a first value substantially equal to that of the further cladding to a second value at a free-space end of the fiber, the second value substantially matching the core refractive index, whereby the effective diameter of the core is that of the core plus the inner cladding, wherein each said beam-steeling element has a width defined as a given multiple of the spot-size of the input fibers, and wherein the input fibers have a ratio of separation-to-spot-size which ratio is selected to be equal to the given multiple times the square root of 2.

* * * * *